US010285122B2

(12) United States Patent
Li

(10) Patent No.: US 10,285,122 B2
(45) Date of Patent: May 7, 2019

(54) METHOD AND APPARATUS FOR HANDLING ABNORMALITY OF NETWORK COMMUNICATION FUNCTION AND STORAGE MEDIUM

(71) Applicant: GUANGDONG OPPO MOBILE TELECOMMUNICATIONS CORP., LTD., Dongguan, Guangdong (CN)

(72) Inventor: Weiqing Li, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 73 days.

(21) Appl. No.: 15/695,411

(22) Filed: Sep. 5, 2017

(65) Prior Publication Data
US 2018/0167873 A1 Jun. 14, 2018

(30) Foreign Application Priority Data

Dec. 13, 2016 (CN) .............................. 201611147210

(51) Int. Cl.
*H04L 12/24* (2006.01)
*H04W 24/04* (2009.01)
(Continued)

(52) U.S. Cl.
CPC ........... *H04W 48/20* (2013.01); *H04W 24/04* (2013.01); *H04W 24/08* (2013.01); *H04W 48/16* (2013.01);
(Continued)

(58) Field of Classification Search
CPC ..... H04W 24/04; H04W 24/08; H04W 48/20; H04W 48/16; H04W 48/02; H04W 76/10; H04W 41/069
See application file for complete search history.

(56) References Cited

U.S. PATENT DOCUMENTS 7,647,390 B2 * 1/2010 Ji ........................... H04L 69/16
709/220
9,204,355 B2 12/2015 Zhang et al.
(Continued)

FOREIGN PATENT DOCUMENTS

CN 1852564 A 10/2006
CN 102065477 A 5/2011
(Continued)

OTHER PUBLICATIONS

Supplementary European Search Report in European application No. 17187084.3, dated Dec. 11, 2017.
(Continued)

*Primary Examiner* — Afsar M Qureshi
(74) *Attorney, Agent, or Firm* — Ladas & Parry LLP

(57) ABSTRACT

Disclosed are a method and apparatus for handling abnormality of a network communication function. When it is determined that a network communication function of a modem is abnormal, the modem is disconnected from a current cell, the current cell is set to be a barred cell, and a first barring duration within which the barred cell is barred is set; and when a duration within which the barred cell is barred is shorter than the first barring duration, one or more cells corresponding to a Radio Access Technology (RAT) supported by the modem is searched for, the cells excluding the barred cell.

20 Claims, 5 Drawing Sheets

(51) Int. Cl.
*H04W 24/08* (2009.01)
*H04W 48/02* (2009.01)
*H04W 48/16* (2009.01)
*H04W 48/20* (2009.01)
*H04W 76/10* (2018.01)

(52) U.S. Cl.
CPC ........... *H04L 41/069* (2013.01); *H04W 48/02* (2013.01); *H04W 76/10* (2018.02)

(56) References Cited

U.S. PATENT DOCUMENTS

| | | |
|---|---|---|
| 9,414,298 B1 | 8/2016 | Pasupuleti et al. |
| 2003/0227653 A1* | 12/2003 | Jeong ................ H04N 1/00002 358/437 |
| 2006/0040700 A1 | 2/2006 | Roberts |
| 2009/0075690 A1* | 3/2009 | Roberts ................ H04W 36/14 455/552.1 |
| 2011/0244902 A1 | 10/2011 | Kim |
| 2012/0015648 A1 | 1/2012 | Roberts |
| 2012/0295650 A1 | 11/2012 | Futaki |
| 2013/0065591 A1 | 3/2013 | Roberts |
| 2013/0165077 A1 | 6/2013 | Aalla et al. |
| 2014/0057631 A1* | 2/2014 | Zhang ................... H04W 48/02 455/436 |
| 2014/0348005 A1 | 11/2014 | Futaki |
| 2015/0141054 A1 | 5/2015 | Futaki |
| 2015/0289173 A1* | 10/2015 | Tyagi ................ H04W 36/0061 455/437 |
| 2016/0353364 A1 | 12/2016 | Pasupuleti |

FOREIGN PATENT DOCUMENTS

| | | |
|---|---|---|
| CN | 102685838 A | 9/2012 |
| CN | 104918303 A | 9/2015 |
| CN | 105376773 A | 3/2016 |
| CN | 105933884   * | 9/2016 |
| CN | 105933884 A | 9/2016 |
| CN | 106507405 A | 3/2017 |
| CN | 106686637 A | 5/2017 |
| CN | 106686638 A | 5/2017 |
| CN | 106851702 A | 6/2017 |
| EP | 2523496 A1 | 11/2012 |

OTHER PUBLICATIONS

International Search Report in international application No. PCT/CN2017/098544, dated Nov. 13, 2017.
English Translation of the Written Opinion of the International Search Authority in international application No. PCT/CN2017/098544, dated Nov. 13, 2017.
Espacenet English abstract of CN 106507405 A.
Espacenet English abstract of CN 106686638 A.
Espacenet English abstract of CN 106851702 A.
Espacenet English abstract of CN 106686637 A.
Espacenet English abstract of CN 105933884 A.
Espacenet English abstract of CN 102685838 A.

* cited by examiner

METHOD AND APPARATUS FOR HANDLING ABNORMALITY OF NETWORK COMMUNICATION FUNCTION AND STORAGE MEDIUM

CROSS-REFERENCE TO RELATED APPLICATIONS

This application claims priority to Chinese Patent Application No. 201611147210.9 filed on Dec. 13, 2016, the disclosure of which is incorporated by reference herein in its entirety.

TECHNICAL FIELD

The disclosure relates to the field of communications, and in particular to a method and apparatus for handling abnormality of a network communication function.

BACKGROUND

Rapid development of mobile Internet makes data services take up a predominant proportion. A modem plays an increasingly important role and thus has an increasingly important place in a mobile phone. The modem is used for converting data to be sent into a radio frequency signal, converting a device signal into data to be processed, processing signaling of an Access Stratum (AS) and a Non-Access Stratum (NAS), and interfacing with an Application Processor (AP). When a mobile network environment in which the mobile phone resides is very complicated, the mobile phone may be frequently switched between different communication systems, and a network communication function of the modem may frequently become abnormal in the process of switching between the communication systems, thus resulting in that the mobile phone cannot be normally networked for communication.

SUMMARY

According to at least some of embodiments of the disclosure, there is provided a method and apparatus for handling abnormality of a network communication function, capable of improving the abnormality recovery efficiency of the network communication function.

In a first aspect, an embodiment of the disclosure provides a method for handling abnormality of a network communication function, which includes: determining that the network communication function of a modem is abnormal; disconnecting the modem from a current cell; setting the current cell to be a barred cell, and setting a first barring duration within which the barred cell is barred; and when a duration within which the barred cell is barred is shorter than the first barring duration, searching for one or more cells corresponding to a Radio Access Technology (RAT) supported by the modem, the cells excluding the barred cell.

In a second aspect, an embodiment of the disclosure provides an apparatus for handling abnormality of a network communication function, which includes: a processor; and a memory for storing instructions executable by the processor, wherein the processor is configured to: determine that the network communication function of a modem is abnormal; disconnect the modem from a current cell; set the current cell to be a barred cell, and set a first barring duration within which the barred cell is barred; and search for one or more cells corresponding to a Radio Access Technology (RAT) supported by the modem, when a duration within which the barred cell is barred is shorter than the first barring duration, the cells excluding the barred cell.

In a third aspect, an embodiment of the disclosure provides a non-transitory computer readable storage medium, which includes instructions, when being executed, perform the method provided in the first aspect.

BRIEF DESCRIPTION OF THE DRAWINGS

In order to more clearly describe the technical solutions in the embodiments of the disclosure, the drawings to be used in the description of the embodiments will be briefly explained hereinafter. Apparently, the drawings described below are merely reflecting some of the embodiments of the disclosure. Other drawings may be obtained by those of ordinary skill in the art without creative work according to these drawings.

DETAILED DESCRIPTION

Figure 1:
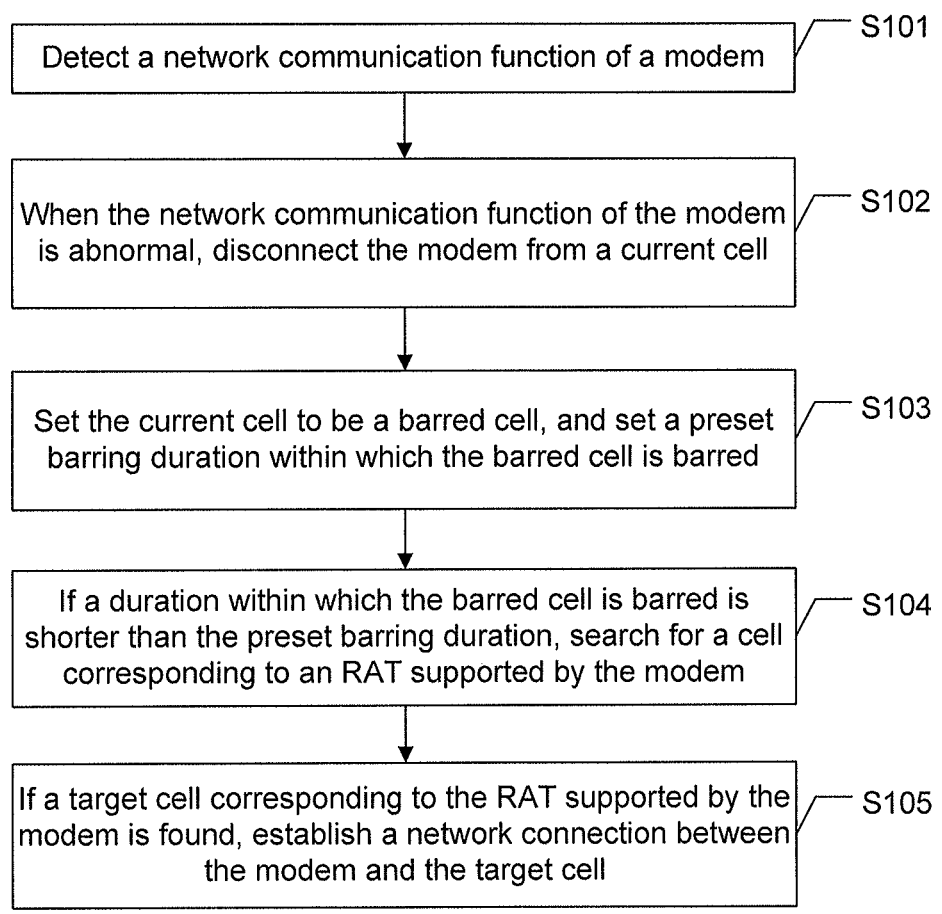
FIG. 1 is a flowchart of a method for handling abnormality of a network communication function according to an embodiment of the disclosure.

The technical solutions in the embodiments of the disclosure will be clearly and completely described below in conjunction with the drawings in the embodiments of the disclosure. Apparently, the described embodiments are merely some of embodiments of the disclosure, not all of the embodiments, all the other embodiments that can be obtained by those of ordinary skill in the art based on the described embodiments of the disclosure without creative work, fall within the scope of protection of the invention.

In the related art, the following solution is employed for solving the problem of communication failure caused by the fact that the modem of the mobile terminal cannot be networked. When the mobile terminal is moved to a new location area, the mobile phone initiates a location update request to a network side, and the network side re-configures the mobile phone and recovers configuration parameters of the modem. This solution consumes a long time. Additionally, when finding that networked communication cannot be achieved for a long time, a user needs to manually and forcedly reboot and recover the mobile terminal, which is inflexible in operation and has low applicability.

In some embodiments of the disclosure, a method for handling abnormality of a network communication function is provided. The method includes that: it is determined that the network communication function of a modem is abnormal, the modem is disconnected from a current cell; the current cell is set to be a barred cell, and a first barring duration within which the barred cell is barred is set; and when a duration within which the barred cell is barred is shorter than the first barring duration, one or more cells corresponding to a Radio Access Technology (RAT) supported by the modem are searched out, the cells excludes the barred cell.

In an embodiment, the method may further include that when the one or more cells corresponding to the RAT supported by the modem are found, a target cell is selected from the one or more found cells; and a network connection is established between the modem and the target cell.

In an embodiment, the method may further include that when the duration within which the barred cell is barred becomes longer than or equal to the first barring duration while no cell corresponding to the RAT supported by the modem has been found, the barred cell is released to be a searchable cell; one or more cells corresponding to the RAT supported by the modem are re-searched for; when the one or more cells corresponding to the RAT supported by the modem are found, a target cell is selected from the found one or more cells; and a network connection is established between the modem and the target cell.

In an embodiment, the setting the current cell to be the barred cell, and setting the first barring duration within which the barred cell is barred may include that: a barred cell information list is created; and identification information of the barred cell and the first barring duration of the barred cell are recorded in the barred cell information list; and the barred cell information list containing the identification information and the first barring duration is stored into a specified storage space. The releasing the barred cell may include that: the identification information and the first barring duration are cleared out of the barred cell information list.

In an embodiment, the disconnecting the modem from the current cell may include that: it is determined whether an abnormality count of the network communication function of the modem within a preset duration is greater than a preset abnormality count threshold; and when the abnormality count is greater than the preset abnormality count threshold, the modem is disconnected from the current cell.

In an embodiment, after establishing network connection between the modem and the target cell, the method may further include that: when an abnormality reason of the network communication function of the modem is not reported, the abnormality reason and a log of the network communication function are acquired; and the abnormality reason, the log and current location information of the modem are reported to a network side.

In an embodiment, the determining that the network communication function of the modem is abnormal may include that: it is determined that the network communication function of the modem is abnormal when detecting at least one of the following events: a Mobile Terminating (MT) call failure or a Mobile Original (MO) call failure, a channel decoding failure, a dedicated bearer activation failure, a dedicated bearer modification failure, a Public Data Network (PDN) connection establishment failure, a data transmission failure, a location update failure, and a network registration failure.

In some embodiments of the disclosure, an apparatus for handling abnormality of a network communication function is provided. The apparatus may include a processor; and a memory for storing instructions executable by the processor. The processor is configured to: determine that the network communication function of a modem is abnormal; disconnect the modem from a current cell; set the current cell to be a barred cell, and set a first barring duration within which the barred cell is barred; and search for one or more cells corresponding to a Radio Access Technology (RAT) supported by the modem, when a duration within which the barred cell is barred is shorter than the first barring duration, the cells excluding the barred cell.

In an embodiment, the processor may further be configured to: select, when one or more cells corresponding to the RAT supported by the modem are found, a target cell from the found one or more cells, and establish network connection between the modem and the target cell.

In an embodiment, the processor may further be configured to release, when the duration within which the barred cell is barred becomes longer than or equal to the first barring duration while no cell corresponding to the RAT supported by the modem has been found, the barred cell to be a searchable cell; and re-search for one or more cells corresponding to the RAT supported by the modem.

In an embodiment, the processor may further be configured to: create a barred cell information list, and record identification information of the barred cell and the first barring duration of the barred cell in the barred cell information list, and store the barred cell information list containing the identification information and the first barring duration into a specified storage space; clear the identification information and the first barring duration out of the barred cell information list when releasing the barred cell.

In an embodiment, the processor may further be configured to: determine whether an abnormality count of the network communication function of the modem within a preset duration is greater than a preset abnormality count threshold, when determining that the network communication function of the modem is abnormal; and disconnect the modem from the current cell, when the abnormality count is greater than the preset abnormality count threshold.

In an embodiment, the processor may further be configured to: acquire, when an abnormality reason of the network communication function of the modem is not reported, the abnormality reason and a log of the network communication function, and report the abnormality reason and the log and current location information of the modem to a network side.

In an embodiment, the processor may further be configured to: determine that the network communication function of the modem is abnormal when detecting at least one of the following events: a Mobile Terminating (MT) call failure or a Mobile Original (MO) call failure, a channel decoding failure, a dedicated bearer activation failure or a dedicated bearer modification failure, a Public Data Network (PDN) connection establishment failure, a data transmission failure, a location update failure, and a network registration failure.

In some embodiments of the disclosure, a non-transitory computer-readable storage medium may be provided, which have stored therein instructions that, when being executed by a processor, cause the processor to perform the method for handling abnormality of a network communication function as described above.

FIG. 1 is a flowchart of a method for handling abnormality of a network communication function according to an embodiment of the disclosure. In the embodiment of the disclosure, the method includes the operations in blocks illustrated in FIG. 1. The method can begin at block S101.

At block S101, a network communication function of a modem is detected.

In some possible implementations, the method for handling abnormality of a network communication function provided in the embodiment of the disclosure may be executed by a modem, or an application processor (AP), where the AP is a super-large-scale integrated circuit for expanding audio/video functions and dedicated interfaces on the basis of a low-power-consumption Central Processing Unit (CPU), and is an important component in a smart phone. The AP and a baseband processor (also referred to as a baseband chip) are two independent chips. The baseband chip includes multiple modules such as the modem.

In some possible implementations, the modem supports multiple protocol stacks. When the modem is abnormal, network registration can be performed through the multiple protocol stacks supported by the modem to resume data services. When the modem detects that the network communication function is abnormal, the modem may break down, and cannot process data normally, thus making a user unable to surf the internet. In order to resume normal networking, the modem needs to determine the abnormality reason of the network communication function, so as to perform network repair according to the reason. Further, after the network communication function is abnormal, the modem may send a message indicative of the abnormality of the network communication function to the AP, and then the AP executes a process of handling the abnormality of the network communication function, namely the AP executes the implementation described by the method for handling abnormality of a network communication function provided in the embodiment of the disclosure. In the embodiment of the disclosure, the execution of the process of handling the abnormality of a network communication function by the modem will be illustrated.

In some possible implementations, the abnormality reason of the network function of the modem may include a Mobile Terminating (MT) call failure or a Mobile Original (MO) call failure, a channel decoding failure, a dedicated bearer activation failure or a dedicated bearer modification failure, a Public Data Network (PDN) connection establishment failure, a data transmission failure, a location update failure, a network registration failure and the like, and is not limited herein.

In some possible implementations, Radio Resource Control (RRC) connection establishment are divided into RRC establishment initiated by MT and RRC establishment initiated by MO. The reasons for the MT/MO failure may be as follows. In an example, the MT/MO failure may be caused by call blocking, i.e., before a User Equipment (UE) initiates RRC connection establishment of MO or MT, access blocking detection is performed according to call blocking parameters of a System Information Block (SIB), and if it is detected that an access is blocked, an RRC connection establishment request message is not sent. In an example, the MT/MO failure may be caused by receiving an RRC connection reject message before a timer T300 expires, i.e., after a base station receives the RRC connection establishment request, if a result about access control or load control indicates that RRC connection establishment is not allowed, the base station will send an RRC connection reject message to the UE. In an example, the MT/MO failure may be caused by not receiving the RRC connection establishment or RRC connection reject message sent by the base station before the timer T300 expires. In an example, the MT/MO failure may be caused by failure in sending the RRC connection establishment request message by the UE (including failure in a random access process). In an example, the MT/MO failure may be caused by a failure in any signaling flow in a call establishment process, such as, no response of a network to a paging response, and authentication failure. When the UE fails in initiating MT/MO, network communication abnormality of the modem will be caused, and the modem may detect that the reason for the network communication abnormality is MT/MO failure.

In some possible implementations, due to some network reasons, when a legal UE registers to a network, the UE may be rejected by the network, causing the UE to enter an Out of Service (OOS) state, and in this case, the UE may be manually rebooted by the user to re-register, where failure reasons of network registration of the UE include network authentication flow failure, a contract signing problem between operators during international roaming, and the like. For example, after the UE sends an attach request or LAU message and before a timer T3410 expires, an attach reject message sent by the network is received, the attach reject message carrying reasons that the network rejects the UE to attach, such as illegal UE, EPS services not allowed, PLMN not allowed and Tracking Area (TA) not allowed. After receiving the attach reject message, the UE enters the OOS state, and the modem may detect that the abnormality reason of the network communication function is network registration failure and the like.

In some possible implementations, dedicated bearer processing may be performed by the modem in a network registration or network usage process of the UE, the processing including dedicated bearer activation or dedicated bearer modification. The dedicated bearer activation or the dedicated bearer modification may be initiated by the UE or a network side. The network side may specifically initiate the dedicated bearer activation or the dedicated bearer modification by sending a dedicated bearer activation request (ACTIVATE DEDICATED EPS BEARER CONTEXT REQUEST) or a dedicated bearer modification request (MODIFY EPS BEARER CONTEXT REQUEST) to the UE. The modem of the UE may specifically initiate the dedicated bearer activation or the dedicated bearer modification by sending a bear resource allocation request message (BEARER RESOURCE ALLOCATION REQUEST) or a bear resource modification request message (BEARER RESOURCE MODIFICATION REQUEST). In the process of the dedicated bearer activation or the dedicated bearer modification, if at least one of the following events occurs in the UE side, abnormality may occur in the dedicated bearer processing, such as dedicated bearer activation failure or dedicated bearer modification failure. These events include: a conflict between an identifier of a dedicated bearer to be activated and an identifier of an existing default bearer, a conflict between the identifier of the dedicated bearer to be activated and an identifier of an existing dedicated bearer, non-establishment of the default bearer associated with the dedicated bearer to be activated, and a failure in sending of an RRC stratum indication message when sending a dedicated bearer activation completion message (ACTIVATE DEDICATED EPS BEARER CONTEXT ACCEPT) or sending a dedicated bearer modification completion message (MODIFY EPS BEARER CONTEXT ACCEPT). The modem may determine whether the dedicated bearer activation or the dedicated bearer modification fails by detecting whether the abovementioned events exist in the process of the dedicated bearer activation or the dedicated bearer modification, so as to determine whether dedicated bearer processing of the modem is abnormal. If it is detected that the dedicated bearer activation fails or the dedicated bearer modification is failed, it may be determined that the network communication function of the modem is abnormal.

In some possible implementations, a Public Data Network (PDN) is a wide area network built by a telecom operator, provides a service and technology for access to the wide area network, and provides a high-quality data transmission service for the user. The PDN is a packet switching or circuit switching service provided by a local-area or long-distance telecommunication bureau; the provided packet switching service usually includes X.25, frame relay, switched multi-megabit data service or asynchronous transmission modes;

the circuit switching service includes a dialing line, switched 56 lines and integrated service digital networks. The mobile terminal accesses the PDN through an Access Point Name (APN), where different APNs correspond to different PDNs, which are defined by operators. The APN refers to an NAT, which is a parameter to be configured for surfing the internet through the UE and decides an access mode in which the UE access the network. The user of the UE may access many types of external networks such as Internet, WAP websites, group enterprise internal networks and industry internal private networks. Accessible ranges and access modes of different access points are different from each other. The PDN interconnects a network control center and a user network access device through the modem, to perform data communication, so as to achieve the aim of surfing the internet. When the UE is successfully connected to the PDN, the user can normally surf the internet through the mobile phone. Once the PDN connection establishment is failed, the mobile phone will not be normally networked.

The modem detects, in real time, whether the PDN connection is successfully established in a running process, and when it is detected that the PDN connection is failed, it may be determined that current connection establishment between the modem and the PDN is failed. The UE initiates to establish a new PDN connection by sending a PDN connection request message, and the network side establishes a new default bearer for the new PDN connection. The reasons for failure of the PDN connection establishment include: the network side rejects PDN connection establishment, a PDN connection establishment request message sent by the UE expires or an RRC stratum indicates a failure in sending the PDN connection establishment request. The reasons that the network side rejects the PDN connection establishment request include: operator blocking, unknown APN, unknown PDN type, authentication failure, PDN type IPv4 not allowed, PDN type IPv6 not allowed, specified APN not allowing multiple PDNs or resource constrained. When the modem detects that the PDN connection is failed, it may be determined that the network communication function of the modem is abnormal.

In some possible implementations, the UE initiates a location registration process by sending location update request messages (such as LOCATION UPDATE REQUEST and TRACKING AREA UPDATE REQUEST), and before the UE completes location update, the UE may fail in location update due to the fact that protocol stacks are abnormal or the network side rejects location update. The reasons for location update failure further include: poor signal coverage or large signal interference results in RRC radio link establishment failure, an NAS receives a wrong indicator from an RRC stratum or receives an NAS signaling connection release indicator from the RRC stratum, the UE enters a new target area (TA), the RRC stratum indicates that the location update request message is unsuccessfully sent, an RRC stratum indication message is unsuccessfully sent when the UE sends a location update completion message (TRACKING AREA UPDATE COMPLETE), a location update allowance message (TRACKING AREA UPDATE ACCEPT) and a location update rejection message (TRACKING AREA UPDATE REJECT) sent by the network side are not received before a timer T3430 expires, the reason field in the location update rejection message (TRACKING AREA UPDATE REJECT) is detected unsuccessfully, a location update process conflicts with other processes, UE authentication is failed or security activation is failed. If it is detected that the location registration of the UE is failed, it may be determined, in this case, that the network communication function of the modem is abnormal.

In some possible implementations, when it is detected that the network communication function is abnormal, the modem may determine whether the abnormality reason of the network communication function is channel decoding failure, and if so, network repair may be performed. The channel decoding failure may include: decoding failure of a common channel such as a paging channel, or decoding failure of a broadcast channel, and is not limited herein.

At block S102, when the network communication function of the modem is abnormal, the modem is disconnected from a current cell.

At block S103, the current cell is set to be a barred cell, and a preset barring duration within which the barred cell is barred is set.

In some possible implementations, after the modem (or AP, the embodiment of the disclosure takes the modem as an example for further illustration) detects that the network communication function of the modem is abnormal, the abnormality reason of the network communication function of the modem may be further determined. In a specific implementation, the modem may detect a running state of the network communication function according to a preset detection period, and if it is detected, within the preset duration, that an abnormality count of the network communication function of the modem is greater than a preset abnormality count threshold, the modem may be disconnected from a current cell. Further, in some possible implementations, the modem may detect, within the preset duration, that the network communication function of the modem becomes abnormal for many times, and when the count of the abnormality for the same reason is greater than the preset abnormality count threshold, the modem is disconnected from the current cell. Thus, the network communication function of the modem can be prevented from being influenced by the abnormality of a network communication function of the current cell.

Further, in some possible implementations, after the modem is disconnected from the current cell, the current cell may be set to be a barred cell. After the modem is disconnected from the current cell, the network may be re-searched to establish a network communication connection with another cell. In this case, the barred cell does not serve as a searchable object during network re-searching, so the modem can be prevented from repeatedly attempting to establish a network connection with the current cell when re-searching the network, thus preventing the network communication function from becoming abnormal repeatedly, and saving the power consumption.

In some possible implementations, after setting the current cell to be the barred cell, the modem may also set a preset barring duration within which the barred cell is barred. After the barred cell is barred, the barred cell will not serve as a network searchable object for the modem to re-establish a network connection within the preset barring duration. After the preset barring duration has lapsed, the barred cell may re-serve as the network searchable object for the modem to re-establish the network connection, so that the network communication function of the barred cell can be prevented from being barred for a long time after being recovered, thus avoiding network resource waste; additionally, such a setting is flexible in operation and has high applicability.

At block S104, if a duration within which the barred cell is barred is shorter than the preset barring duration, a cell corresponding to an RAT supported by the modem is searched for.

In some possible implementations, after the modem is disconnected from the current cell, an accessible network may be re-searched within a duration period in which the barred cell is barred. In a specific implementation, the modem may search for a cell service corresponding to an RAT supported by the modem. In this case, as the network which is accessed when the network communication of the modem is abnormal has been set to be the barred cell, the barred cell is not included in the searchable object during network re-searching, and therefore it can avoid the barred cell from being re-accessed, thus avoiding abnormality of network communication function for the same reason from occurring repeatedly.

At block S105, if a target cell corresponding to the RAT supported by the modem is found, a network connection between the modem and the target cell is established.

In some possible implementations, if a cell (i.e., target cell) corresponding to the RAT supported by the modem is found, a network connection between the modem and the target cell may be established, and the network communication of the modem is performed through the target cell. The network connection between the modem and the target cell is established, so that the network communication function of the modem may be quickly recovered.

Further, in some possible implementations, if the target cell corresponding to the RAT supported by the modem cannot be found, the modem may be rebooted to recover the network communication function of the modem. This manner is simple in operation and high in the recovery efficiency of the network communication function.

In the embodiment of the disclosure, when the network communication function of the modem is abnormal, the modem may be disconnected from the current cell, and the current cell may be set to be the barred cell to avoid resource consumption caused by the fact that the modem repeatedly attempts to establish a communication connection with the current cell. Further, other cells corresponding to the RAT supported by the modem may be re-searched for, a target cell may be selected from the other cells, a communication connection between the modem and the target cell may be established, and the network communication function of the modem may be recovered, thus improving the recovery efficiency of the network communication function.

Figure 2:
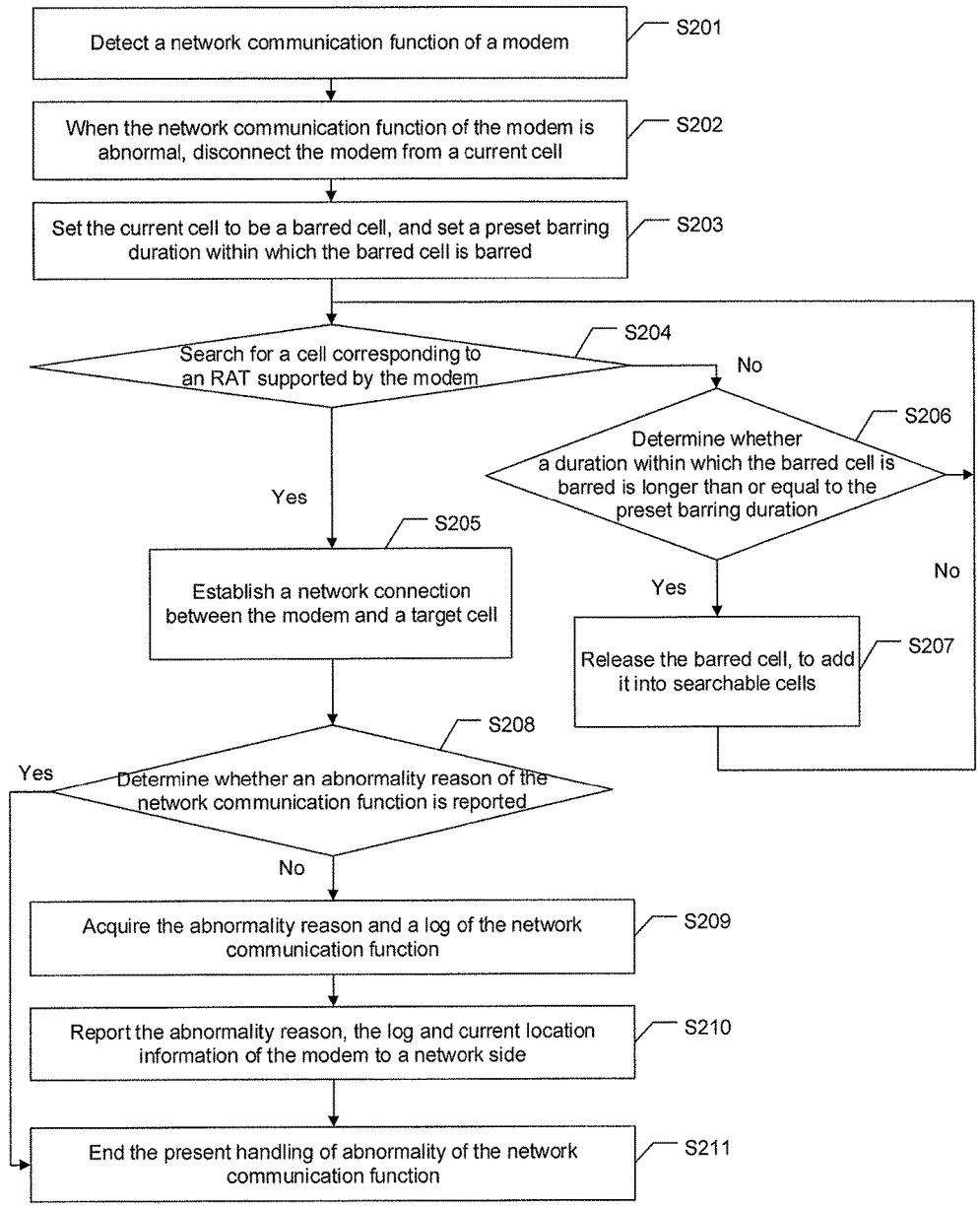
FIG. 2 is another flowchart of a method for handling abnormality of a network communication function according to an embodiment of the disclosure.

FIG. 2 is another flowchart of a method for handling abnormality of a network communication function according to an embodiment of the disclosure. In the embodiment of the disclosure, the method includes the operations in blocks illustrated in FIG. 2. The method can begin at block S201.

At block S201, a network communication function of a modem is detected.

In some possible implementations, the modem (or AP) detects the network communication function of the modem to determine whether the network communication function of the modem is abnormal. The specific implementations may refer to the description of the operation at block S101, which will not be elaborated herein.

At block S202, when the network communication function of the modem is abnormal, the modem is disconnected from a current cell.

At block S203, the current cell is set to be a barred cell, and a preset barring duration within which the barred cell is barred is set.

In some possible implementations, the specific implementation for disconnecting the modem from the current cell when the network communication function of the modem is abnormal may refer to the description of the operations at block S102 and block S103, which will not be elaborated herein.

Further, in some possible implementations, the modem may preset a monitoring duration of the network communication function of the modem. If the network communication function of the modem becomes abnormal repeatedly within the monitoring duration, the modem may be disconnected from the current cell, and the current cell is set to be a barred cell. When the network communication function of the modem becomes abnormal repeatedly within the monitoring duration, the modem is disconnected from the current cell, so that it can avoid the current cell from being wrongly barred when other factors result in the abnormality of the network communication function of the modem, which may affect recovery of the network communication function of the modem.

In some possible implementations, the modem may pre-establish a barred cell information list and store the list into a specified storage space (e.g., non-volatile storage space of the UE). After setting the current cell to be the barred cell, the modem may record identification information of the current cell and the preset barring duration within which the barred cell is barred in the barred cell information list, so as to store the identification information of the current cell and the preset barring duration into the specified storage space, where the identification information of the current cell may be location information of the current cell. The location information represents an identifier of a pre-planned logic location in a mobile communication network. The location information may include a Cell Identity (CID), a Location Area Code (LAC), a Tracking Area Code (TAC) of a cell served by a neighbor Enb, and the like, which may be specifically determined as desired in an actual application scenario and will not be limited herein.

At block S204, a cell corresponding to an RAT supported by the modem is searched for, if a target cell is found, operation at block S205 is executed, and otherwise, operation at block S206 is executed.

In some possible implementations, the network searching implementation of the modem may refer to block S104 in the abovementioned embodiment, which will not be elaborated herein.

Further, if a duration within which the barred cell is barred is shorter than the preset barring duration, a cell corresponding to an RAT supported by the modem is re-searched for, and the barred cell does not serve as a searchable object. If the duration within which the barred cell is barred is longer than or equal to the preset barring duration, the barred cell may be re-added as a searchable object for network searching of the modem, so as to avoid waste of network resources.

At block S205, a network connection between the modem and the target cell is established.

In some possible implementations, the modem finds the target cell, so that the network connection between the modem and the target cell may be established, so as to quickly recover the network communication function of the modem. Such a manner is simple in operation, and has a high recovery efficiency of the network communication function of the modem.

At block S206, it is determined whether a duration within which the barred cell is barred is longer than or equal to the preset barring duration, if so, operation at block S207 is executed, and otherwise, operation at block S204 is executed.

At block S207, the barred cell is released to be added into cells that can be re-searched, and the operation at block S204 is executed.

In some possible implementations, if the duration within which the barred cell is barred is longer than or equal to the preset barring duration, the barred cell may be released and added into the searchable objects for network searching of the modem. In a specific implementation, when the barred cell is released, the identification information of the barred cell and the corresponding preset barring duration may be cleared out of the barred cell information list. After releasing the barred cell, the modem may re-search for the cell corresponding to the RAT supported by the modem. In this case, in a current scenario, if the previous problem of the barred cell has been repaired and if the modem finds the previous barred cell, the modem may re-attempt to access this cell, so as to recover the network communication function of the modem.

At block S208, it is determined whether the abnormality reason of the network communication function is reported.

Specifically, if the abnormality reason of the network communication function has been reported, S211 is continuously executed, and otherwise, S209 is executed.

At block S209, the abnormality reason and a log of the network communication function are acquired.

In some possible implementations, the abnormality reason of the network communication function may refer to the implementation described in the operation at block S101 in the abovementioned embodiment, and will not be elaborated herein. The log represents operation information about access of the modem to an internal memory, the operation information including: an operation instruction, operation time, a returned result and the like.

At block S210, the abnormality reason, the log and current location information of the modem are reported to a network side.

In some possible implementations, the modem may report the abnormality reason, the current location information and the log to the network side. Specifically, the modem may scan surrounding WiFi hot spots and establish a connection with a WiFi hot spot. The modem may report the abovementioned information to the network side through the WiFi hot spot when a mobile terminal is connected to the WiFi hot spot, so as to save traffic. Or, the modem may display the abnormality reason on a display screen of the mobile terminal, to allow the user to check.

At block S211, the present abnormality handling of the network communication function is ended.

In the embodiment of the disclosure, when the network communication function of the modem is abnormal, the modem is disconnected from the current cell under the condition that abnormality of the network communication function of the modem occurs repeatedly within the monitoring duration, the current cell may be set to be a barred cell, and the preset barring duration within which the barred cell is barred may be set. Not only the current cell can be prevented from being wrongly barred during the abnormality of the network communication function of the modem caused by other problems, but also resource consumption caused by the fact that the modem repeatedly attempts to establish a communication connection with the current cell when the service of the current cell is abnormal can be avoided. Further, other cells corresponding to the RAT supported by the modem may be re-searched for, a target cell may be selected from the other cells, a communication connection between the modem and the target cell may be established, and the network communication function of the modem may be recovered, thus improving the recovery efficiency of the network communication function. If the duration within which the barred cell is barred is longer than or equal to the preset barring duration, the barred cell may be released as a searchable object, thus further guaranteeing the network communication function of the modem, and enhancing the flexibility in abnormality recovery of the network communication function of the modem.

Figure 3:
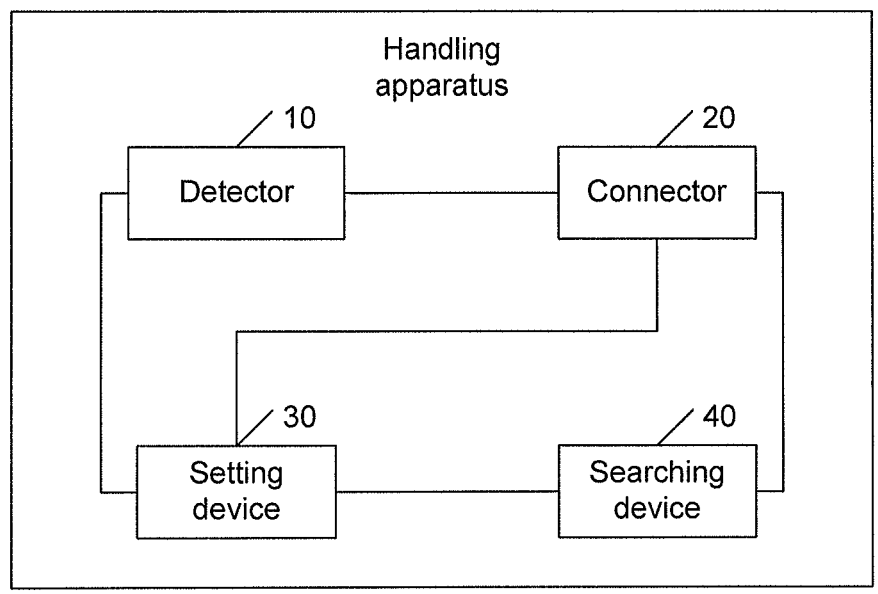
FIG. 3 is a block diagram of a apparatus for handling abnormality of a network communication function according to an embodiment of the disclosure.

FIG. 3 is a block diagram of an apparatus for handling abnormality of a network communication function according to an embodiment of the disclosure. Referring to FIG. 3, in the embodiment of the disclosure, the apparatus for handling abnormality of a network communication function may be a modem or an AR. The modem may be a functional module in the AP or may be a functional module that is disposed outside the AP and establishes a communication connection with the AP, which is not limited herein. The apparatus for handling abnormality of a network communication function provided in the embodiment of the disclosure includes a detector 10, a connector 20, a setting device 30, and a searching device 40.

The detector 10 is configured to detect whether a network communication function of a modem is abnormal.

The connector 20 is configured to disconnect the modem from a current cell when the detector detects that the network communication function of the modem is abnormal.

The setting device 30 is configured to set the current cell as a barred cell, and set a preset barring duration within which the barred cell is barred.

The searching device 40 is configured to search, when a duration within which the barred cell is barred is shorter than the preset barring duration set by the setting device, cells corresponding to an RAT supported by the modem, the cells excluding the barred cell.

The connector 20 is further configured to establish, when the searching device finds a target cell corresponding to the RAT supported by the modem, a network connection between the modem and the target cell.

In some possible implementations, the setting device 30 is further configured to release, when the duration within which the barred cell is barred is longer than or equal to the preset barring duration, the barred cell to add the barred cell into the cells re-searched by the searching device.

The searching device 40 is further configured to re-search the cells corresponding to the RAT supported by the modem.

Figure 4:
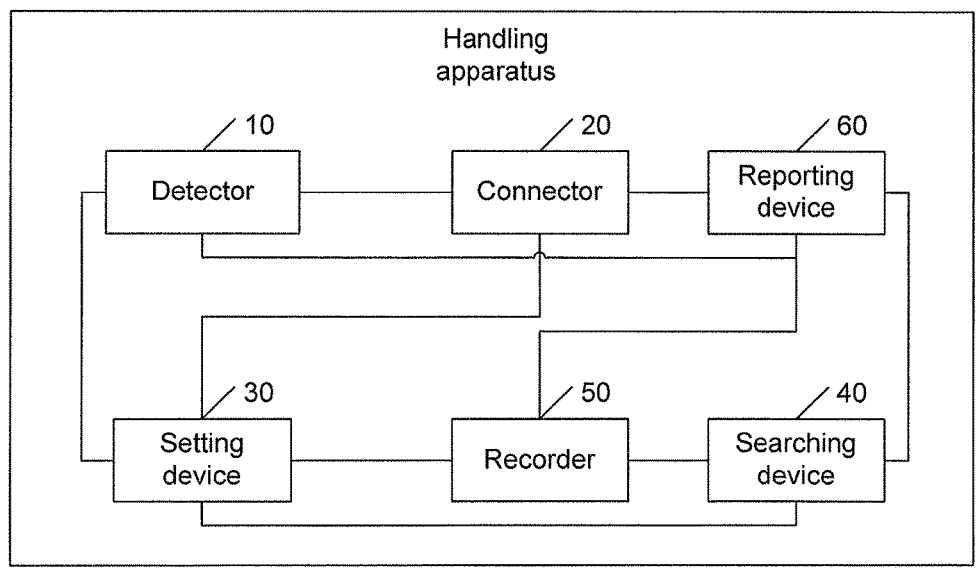
FIG. 4 is another block diagram of an apparatus for handling abnormality of a network communication function according to an embodiment of the disclosure.

In some possible implementations, as shown in FIG. 4, FIG. 4 is another structural diagram of an abnormality handling apparatus for a network communication function according to an embodiment of the disclosure. The handling apparatus provided in the embodiment of the disclosure further includes a recorder 50.

The recorder 50 is configured to establish a barred cell information list, and record identification information of the barred cell and the preset barring duration of the barred cell in the barred cell information list.

The recording module 50 is further configured to store the barred cell information list including the identification information and the preset barring duration into a specified storage space.

The setting device 30 is configured to clear away the identification information and the preset barring duration included in the barred cell information list.

In some possible implementations, the connector 20 is configured to determine, when the detector detects that the network communication function of the modem is abnormal, whether an abnormality count of the network communication function of the modem within the preset duration is greater than a preset abnormality count threshold, and break, if so, a network connection between the modem and the current cell.

In some possible implementations, the handling apparatus provided in the embodiment of the disclosure further includes a reporting device 60.

The reporting device 60 is configured to acquire, when the detector detects that abnormality reason of the network communication function are not reported, abnormal reasons and logs of the network communication function, and report the abnormality reason and the log and current location information of the modem to a network side.

In some possible implementations, the reporting device 60 is configured to scan surrounding WiFi hot spots, establish a communication connection with the WiFi hot spots, and then report the abnormality reason and the log and the current location information to the network side through the WiFi hot spots with which the communication connection is established.

The embodiment of the disclosure and each embodiment for the method for handling abnormality of a network communication function provided in the embodiment of the disclosure are based on the same concept, and the technical effects are the same. A specific implementation mode may refer to the implementation mode described in each of the abovementioned embodiments, and will not be elaborated herein.

In the embodiment of the disclosure, when the network communication function of the modem is abnormal, the modem is disconnected from the current cell under the condition that abnormality of the network communication function of the modem occurs repeatedly within the monitoring duration, the current cell may be set to be a barred cell, and the preset barring duration within which the barred cell is barred may be set. Not only the current cell can be prevented from being wrongly barred during the abnormality of the network communication function of the modem caused by other problems, but also resource consumption caused by the fact that the modem repeatedly attempts to establish a communication connection with the current cell when the service of the current cell is abnormal can be avoided. Further, other cells corresponding to the RAT supported by the modem may be re-searched for, a target cell may be selected from the other cells, a communication connection between the modem and the target cell may be established, and the network communication function of the modem may be recovered, thus improving the recovery efficiency of the network communication function. If the duration within which the barred cell is barred is longer than or equal to the preset barring duration, the barred cell may be released as a searchable object, thus further guaranteeing the network communication function of the modem, and enhancing the flexibility in abnormality recovery of the network communication function of the modem.

Figure 5:
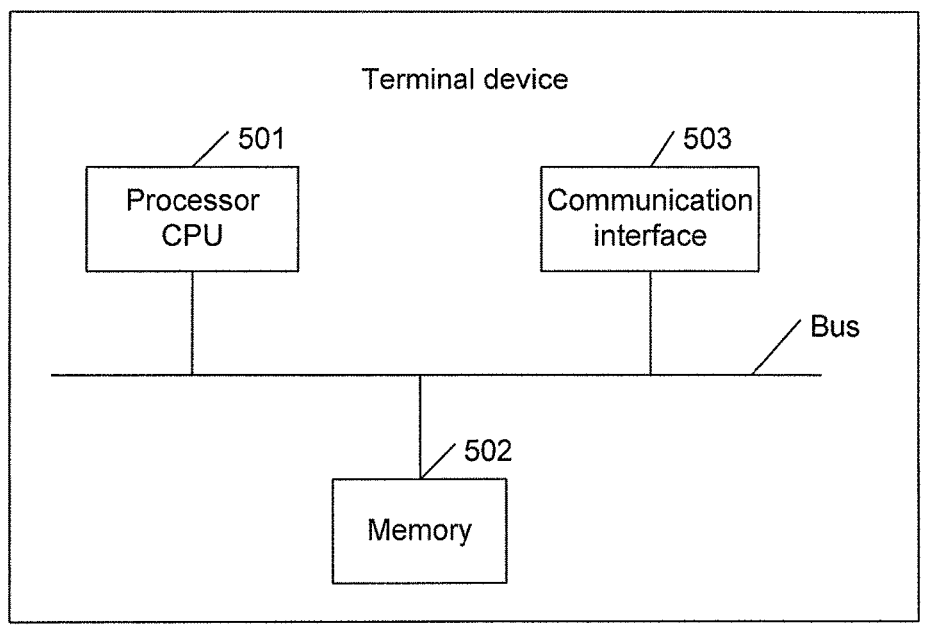
FIG. 5 is a block diagram of a terminal device according to an embodiment of the disclosure.

FIG. 5 is a block diagram of a terminal device according to an embodiment of the disclosure. Referring to FIG. 5, in the embodiment of the disclosure, the terminal device may be a modem or an AP. The modem may be a functional module in the AP or may be a functional module that is disposed outside the AP and establishes a communication connection with the AP, which is not limited herein. In the embodiment of the disclosure, the modem (or AP) is used for implementing the method for handling abnormality of a network communication function provided in the embodiment of the disclosure. The terminal device includes a central processing unit (CPU) 501, a memory 502 and a communication interface 503, there may be one or more CPUs 501 in the terminal device, and one CPU is used as an example in FIG. 5. In some embodiments of the disclosure, the CPU 501, the memory 502 and the communication interface 503 may be connected through a bus or the like. In FIG. 5, bus connection is used as an example.

The memory 502 stores a set of program codes, and the CPU 501 is configured to call the program codes stored in the memory 502 to: detect a network communication function of a modem; when the network communication function of the modem is abnormal, disconnect the modem from a current cell; set the current cell as a barred cell, and set a preset barring duration within which the barred cell is barred; if a duration within which the barred cell is barred is shorter than the preset barring duration, search for cells corresponding to an RAT supported by the modem, the cells excluding the barred cell; and if a target cell corresponding to the RAT supported by the modem is found, establish a network connection between the modem and the target cell.

In some embodiments of the disclosure, the CPU 501 is further configured to: if the duration within which the barred cell is barred is longer than or equal to the preset barring duration, release the barred cell to add the barred cell into cells that can be re-searched; re-searching the cells corresponding to the RAT supported by the modem; and if a target cell corresponding to the RAT supported by the modem is found, establish a network connection between the modem and the target cell.

In some embodiments of the disclosure, the CPU 501 is further configured to: establish a barred cell information list, and record identification information of the barred cell and the preset barring duration of the barred cell in the barred cell information list; and store the barred cell information list including the identification information and the preset barring duration into a specified storage space.

In some embodiments of the disclosure, the CPU 501 is further configured to clear the identification information and the preset barring duration out of the barred cell information list.

In some embodiments of the disclosure, the CPU 501 is further configured to: when the detector detects that the network communication function of the modem is abnormal, determine whether an abnormality count of the network communication function of the modem within the preset duration is greater than a preset abnormality count threshold; and if so, disconnect the modem from the current cell.

In some embodiments of the disclosure, the CPU 501 is further configured to: if an abnormality reason of the network communication function of the modem is not reported, acquire the abnormality reason and a log of the network communication function; and report the abnormality reason, the log and current location information of the modem to a network side.

In some embodiments of the disclosure, the CPU 501 is further configured to: scan surrounding WiFi hot spots, establish a communication connection with a WiFi hot spot, and then report the abnormality reason and the log and the current location information to the network side through the WiFi hot spot with which the communication connection is established.

In a specific implementation, a specific implementation process of each module of the terminal device (modem or AP) may refer to the description in each operation in the first embodiment and the second embodiment for the abovementioned method, and will not be elaborated herein.

In an embodiment of the disclosure, when the network communication function of the modem is abnormal, the modem is disconnected from the current cell under the condition that the network communication function of the modem becomes abnormal repeatedly within the monitoring duration, the current cell may be set to be a barred cell, and the preset barring duration within which the barred cell is barred may be set. Not only the current cell can be prevented from being wrongly barred during the abnormality of the network communication function of the modem caused by other problems, but also resource consumption caused by the fact that the modem repeatedly attempts to establish a communication connection with the current cell when the service of the current cell is abnormal can be avoided. Further, other cells corresponding to the RAT supported by the modem may be re-searched for, a target cell may be selected from the other cells, a communication connection between the modem and the target cell may be established, and the network communication function of the modem may be recovered, thus improving the recovery efficiency of the network communication function. If the duration within which the barred cell is barred is longer than or equal to the preset barring duration, the barred cell may be released as a searchable object, thus further guaranteeing the network communication function of the modem, and enhancing the flexibility in abnormality recovery of the network communication function of the modem.

An embodiment of the disclosure provides a mobile terminal including the modem or AP. The mobile terminal includes, but is not limited to, a mobile terminal having iOS®, Android®, Microsoft® or other operating systems, such as a mobile phone, or may be any other mobile terminal such as a laptop computer or a tablet personal computer or a desk computer having a touch-sensitive surface (e.g., touch screen display and/or touch panel).

In the following discussion, a mobile terminal including a display and a touch-sensitive surface is introduced. However, it is to be understood that the mobile terminal may include one or more other physical user interface devices such as a physical keyboard, a mouse and/or an operating rod.

The mobile terminal usually supports multiple application programs such as one or more of the following: a drawing application program, a presentation application program, a text processing application program, a web page creating application program, a disk editing application program, an excel application program, a game application program, a telephone application program, a video session application program, an E-mail application program, an instant message application program, an exercise supporting application program, a photo management application program, a digital camera application program, a digital video camera application program, a network browsing application program, a digital music player application program, and/or a digital video player application program.

Various application programs that can be executed on the mobile terminal may adopt at least one shared physical user interface device such as a touch-sensitive surface. One or more functions of the touch-sensitive surface and corresponding information displayed on the mobile terminal may be adjusted and/or changed from an application program to a next application program or adjusted and/or changed within a corresponding application program. Thus, a shared physical architecture of the mobile terminal may support various application programs by utilizing a user interface visual and clear to a user.

Those of ordinary skill in the art may understand that all or some flows in the method of the abovementioned embodiment may be completed by instructing relevant hardware through a computer program, the program may be stored in a computer-readable storage medium, and when being executed, the program may include the flows of each method embodiment, where the storage medium may be a magnetic disk, an optical disk, a Read-Only Memory (ROM), a Random Access Memory (RAM) or the like.

The above is merely a preferred embodiment of the disclosure and cannot be thus limitative of the patent scope of the disclosure. Those of ordinary skill in the art may understand that all or some flows for the abovementioned embodiment are implemented and equivalent change made according to the claims of the disclosure falls within the scope of the disclosure.

What is claimed is:

1. A method for handling abnormality of a network communication function, comprising:
   determining that the network communication function of a modem is abnormal;
   disconnecting the modem from a current cell;
   setting the current cell to be a barred cell, and setting a first barring duration within which the barred cell is barred; and
   when a duration within which the barred cell is barred is shorter than the first barring duration, searching for one or more cells corresponding to a Radio Access Technology (RAT) supported by the modem, the cells excluding the barred cell.

2. The method according to claim 1, further comprising:
   when the one or more cells corresponding to the RAT supported by the modem are found, selecting a target cell from the one or more found cells; and
   establishing a network connection between the modem and the target cell.

3. The method according to claim 1, further comprising:
   when the duration within which the barred cell is barred becomes longer than or equal to the first barring duration while no cell corresponding to the RAT supported by the modem has been found, releasing the barred cell to be a searchable cell;
   re-searching for one or more cells corresponding to the RAT supported by the modem;
   when the one or more cells corresponding to the RAT supported by the modem are found, selecting a target cell from the found one or more cells; and
   establishing a network connection between the modem and the target cell.

4. The method according to claim 3, wherein the setting the current cell to be the barred cell, and setting the first barring duration within which the barred cell is barred comprises:
   creating a barred cell information list, and recording identification information of the barred cell and the first barring duration of the barred cell in the barred cell information list; and
   storing the barred cell information list containing the identification information and the first barring duration into a specified storage space; and
   wherein the releasing the barred cell comprises:
   clearing the identification information and the first barring duration out of the barred cell information list.

5. The method according to claim 1, wherein the disconnecting the modem from the current cell comprises:

determining whether an abnormality count of the network communication function of the modem within a preset duration is greater than a preset abnormality count threshold; and when the abnormality count is greater than the preset abnormality count threshold, disconnecting the modem from the current cell.

6. The method according to claim 1, wherein after establishing network connection between the modem and the target cell, the method further comprises:

when an abnormality reason of the network communication function of the modem is not reported, acquiring the abnormality reason and a log of the network communication function; and reporting the abnormality reason, the log and current location information of the modem to a network side.

7. The method according to claim 1, wherein the determining that the network communication function of the modem is abnormal comprises:

determining that the network communication function of the modem is abnormal when detecting at least one of the following events: a Mobile Terminating (MT) call failure or a Mobile Original (MO) call failure, a channel decoding failure, a dedicated bearer activation failure, a dedicated bearer modification failure, a Public Data Network (PDN) connection establishment failure, a data transmission failure, a location update failure, and a network registration failure.

8. An apparatus for handling abnormality of a network communication function, comprising:

a processor; and a memory for storing instructions executable by the processor, wherein the processor is configured to:

determine that the network communication function of a modem is abnormal;

disconnect the modem from a current cell;

set the current cell to be a barred cell, and set a first barring duration within which the barred cell is barred; and search for one or more cells corresponding to a Radio Access Technology (RAT) supported by the modem, when a duration within which the barred cell is barred is shorter than the first barring duration, the cells excluding the barred cell.

9. The apparatus according to claim 8, wherein the processor is further configured to:

select, when one or more cells corresponding to the RAT supported by the modem are found, a target cell from the found one or more cells, and establish network connection between the modem and the target cell.

10. The apparatus according to claim 8, wherein the processor is further configured to release, when the duration within which the barred cell is barred becomes longer than or equal to the first barring duration while no cell corresponding to the RAT supported by the modem has been found, the barred cell to be a searchable cell; and re-search for one or more cells corresponding to the RAT supported by the modem.

11. The apparatus according to claim 10, wherein the processor is further configured to:

create a barred cell information list, and record identification information of the barred cell and the first barring duration of the barred cell in the barred cell information list, and store the barred cell information list containing the identification information and the first barring duration into a specified storage space;

clear the identification information and the first barring duration out of the barred cell information list when releasing the barred cell.

12. The apparatus according to claim 8, wherein the processor is further configured to:

determine whether an abnormality count of the network communication function of the modem within a preset duration is greater than a preset abnormality count threshold, when determining that the network communication function of the modem is abnormal; and disconnect the modem from the current cell, when the abnormality count is greater than the preset abnormality count threshold.

13. The apparatus according to claim 8, wherein the processor is further configured to:

acquire, when an abnormality reason of the network communication function of the modem is not reported, the abnormality reason and a log of the network communication function, and report the abnormality reason and the log and current location information of the modem to a network side.

14. The apparatus according to claim 8, wherein the processor is configured to:

determine that the network communication function of the modem is abnormal when detecting at least one of the following events: a Mobile Terminating (MT) call failure or a Mobile Original (MO) call failure, a channel decoding failure, a dedicated bearer activation failure or a dedicated bearer modification failure, a Public Data Network (PDN) connection establishment failure, a data transmission failure, a location update failure, and a network registration failure.

15. A non-transitory computer-readable storage medium, having stored therein instructions that, when being executed by a processor, cause the processor to perform a method for handling abnormality of a network communication function, comprising:

determining that the network communication function of a modem is abnormal;

disconnecting the modem from a current cell;

setting the current cell to be a barred cell, and setting a first barring duration within which the barred cell is barred; and when a duration within which the barred cell is barred is shorter than the first barring duration, searching for one or more cells corresponding to a Radio Access Technology (RAT) supported by the modem, the cells excluding the barred cell.

16. The non-transitory computer-readable storage medium according to claim 15, wherein the method further comprises:

when the one or more cells corresponding to the RAT supported by the modem are found, selecting a target cell from the one or more found cells; and establishing a network connection between the modem and the target cell.

17. The non-transitory computer-readable storage medium according to claim 15, wherein the method further comprises:

when the duration within which the barred cell is barred becomes longer than or equal to the first barring duration while no cell corresponding to the RAT supported by the modem has been found, releasing the barred cell to be a searchable cell;

re-searching for one or more cells corresponding to the RAT supported by the modem;

when the one or more cells corresponding to the RAT supported by the modem are found, selecting a target cell from the found one or more cells; and establishing a network connection between the modem and the target cell.

18. The non-transitory computer-readable storage medium according to claim 17, wherein the setting the current cell to be the barred cell, and setting the first barring duration within which the barred cell is barred comprises:

creating a barred cell information list, and recording identification information of the barred cell and the first barring duration of the barred cell in the barred cell information list; and storing the barred cell information list containing the identification information and the first barring duration into a specified storage space; and wherein the releasing the barred cell comprises:

clearing the identification information and the first barring duration out of the barred cell information list.

19. The non-transitory computer-readable storage medium according to claim 15, wherein the disconnecting the modem from the current cell comprises:

determining whether an abnormality count of the network communication function of the modem within a preset duration is greater than a preset abnormality count threshold; and when the abnormality count is greater than the preset abnormality count threshold, disconnecting the modem from the current cell.

20. The non-transitory computer-readable storage medium according to claim 15, wherein after establishing network connection between the modem and the target cell, the method further comprises:

when an abnormality reason of the network communication function of the modem is not reported, acquiring the abnormality reason and a log of the network communication function; and reporting the abnormality reason, the log and current location information of the modem to a network side.

* * * * *